(12) United States Patent
Estes

(10) Patent No.: US 10,010,054 B1
(45) Date of Patent: Jul. 3, 2018

(54) AUTOMATED HORSE TRACKING, TRAINING, AND COMPETITION SYSTEM

(71) Applicant: Lloyd F. Estes, Springtown, TX (US)

(72) Inventor: Lloyd F. Estes, Springtown, TX (US)

(*) Notice: Subject to any disclaimer, the term of this patent is extended or adjusted under 35 U.S.C. 154(b) by 0 days.

(21) Appl. No.: 14/959,164

(22) Filed: Dec. 4, 2015

Related U.S. Application Data

(63) Continuation-in-part of application No. 14/561,424, filed on Dec. 5, 2014.

(60) Provisional application No. 62/087,333, filed on Dec. 4, 2014.

(51) Int. Cl.
| | |
|---|---|
| *A01K 15/00* | (2006.01) |
| *A01K 15/02* | (2006.01) |
| *A01K 29/00* | (2006.01) |
| *G08C 17/02* | (2006.01) |

(52) U.S. Cl.
CPC .......... *A01K 15/027* (2013.01); *A01K 29/005* (2013.01); *G08C 17/02* (2013.01)

(58) Field of Classification Search
CPC .............................. A01K 15/02; A01K 15/027
USPC .......................................... 119/707, 708, 839
See application file for complete search history.

(56) References Cited

U.S. PATENT DOCUMENTS

| | | | | |
|---|---|---|---|---|
| 3,303,821 A | * | 2/1967 | Harris .................. | A01K 15/027 119/839 |
| 3,324,832 A | * | 6/1967 | McCain ............... | A01K 15/027 119/839 |
| 3,776,553 A | | 12/1973 | Kelton | |
| 4,266,779 A | | 5/1981 | English | |
| 4,601,261 A | * | 7/1986 | Genelin ............... | A01K 15/027 119/839 |
| 4,738,223 A | * | 4/1988 | Andreasen ........... | A01K 15/027 119/839 |
| 4,960,076 A | * | 10/1990 | Snorgrass .......... | A63B 69/0068 119/839 |
| 5,255,629 A | | 10/1993 | Paterson | |
| 5,325,817 A | | 7/1994 | Huffman | |
| 5,367,232 A | | 11/1994 | Netherton et al. | |
| 6,629,695 B2 | * | 10/2003 | Tisdell ............... | A63B 69/0068 119/839 |
| 7,009,561 B2 | | 3/2006 | Menache et al. | |
| 2006/0266299 A1 | * | 11/2006 | DiAntonio .......... | A01K 15/025 119/708 |
| 2007/0017456 A1 | | 1/2007 | Huett | |

(Continued)

OTHER PUBLICATIONS

Wazz-a-Cow Cutter. (Apr. 10, 2013). Retrieved from http://web.archive.org/web/20130410073347/http://wazzacow.com.au/index-3.html.*

(Continued)

*Primary Examiner* — Tien Q Dinh
*Assistant Examiner* — Aaron M Rodziwicz
(74) *Attorney, Agent, or Firm* — Law Office of Sam Sokhansanj PLLC

(57) ABSTRACT

A method, system, and apparatus are provided for a cutting horse trainer that operates to train a cutting horse without additional input from an operator or trainer. More specifically, in one aspect of the disclosure described herein, positioning systems, such as transmitters, receivers, camera tracking, gyroscopes, accelerometers, and/or GPS tracking allow a cutting horse trainer system to detect the position of the horse with respect to a field of view (azimuth) of a decoy, and automatically adjust the position of the decoy accordingly.

18 Claims, 9 Drawing Sheets

(56) References Cited

U.S. PATENT DOCUMENTS

2008/0289585 A1* 11/2008 Suggs, Sr. ............ A01K 15/027
119/839
2011/0275041 A1 11/2011 Reynolds

OTHER PUBLICATIONS

Cubero, S. N. (2012). Robotic horse training technologies for Cutting and Campdrafting competitions. Retrieved from SciVerse ScienceDirect: http://ac.els-cdn.com/S1877705812025593/1-s2.0-S1877705812025593-main.pdf?_tid=f776a18a-bd8d-11e6-baa0-00000aab0f01&acdnat=1481232992_9b43a44e54e1f44cfa182ae2551b6537.*

Dr. Patricia Evans, "Equine Vision and Its Effect on Behavior", 3 pp., Utah State University, Dec. 2010.

Dr. Hilary Clayton, "Kinematic analysis of cutting horses working a mechanical flag", 28 pp., University of Saskatchewan, Aug. 1989.

Equi-Spirit toys and tools. (Jun. 2, 2011), 14 pp. Retrieved from Equi-Spirit Toys: http://www.equi-spirit-toys.com/.

Laurentis, S. D. (Oct. 8, 2010). Lets Play Ball! Retrieved from Ride! 2 pp. The Online Horse News Magazine: http://www.ridemagazine.com/horse/article/lets-play-ball.

Tommy Garland Demonstrates Equine Training Ball. (Mar. 14, 2010), 2 pp. Retrieved from YouTube: https://youtu.be/YPAi3-eAX8c.

Tommy Garland demonstrates using the Equine training ball while on the ground. (Mar. 14, 2010), 2 pp. Retrieved from YouTube: https://youtu.be/xvrqOc5KC08.

CowTrac: The Ultimate Mechanical Cow, 5 pp., publication date unknown. Retrieved on Mar. 13, 2018 from: http://www.cowtrac.com/index.html.

Soloshot Robert Cameraman, 14 pp., publication date unknown. Retrieved on Mar. 13, 2018 from: https://soloshot.com/.

* cited by examiner

AUTOMATED HORSE TRACKING, TRAINING, AND COMPETITION SYSTEM

CROSS REFERENCE TO RELATED APPLICATIONS

This application claims the benefit of U.S. Provisional Application No. 62/087,333 filed on Dec. 4, 2014, which is incorporated herein by reference in its entirety, and is a continuation-in-part of U.S. Non-Provisional application Ser. No. 14/561,424 filed on Dec. 5, 2014, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Cutting horses are used in cattle herding operations to separate calves from a herd. The cutting horse rider maneuvers the calf away from the herd by approaching the calf head-on with the cutting horse, thereby forcing the calf to be removed or "cut" from the herd. Cutting horses require special training to be able to perform the cutting function. In addition, the training must be often repeated to keep a good cutting horse at the top of its form. Cutting horse training is not only a time-consuming process but also an expensive one. This is because live calves can only be used in a cutting situation three or four times before they lose their fear of the cutting horse and learn to act inappropriately. Thus, a cutting horse trainer requires an endless of supply of calves that have not previously faced cutting situations. The logistics and expense of such an operation are out of the reach of all but the most serious users of cutting horses or cutting horse enthusiasts.

Another factor at work in the modern day cutting horse field is the fact that cattle ranches by and large no longer use cutting horses in their every day cattle operations. Now cutting operations are performed by cowboys on motor bikes or four-wheeled all terrain vehicles. There is, however, an ever-growing hobby and sport use of cutting horses, with competitions being regularly held at rodeos, state fairs and the like across western part of the United States, for example, such competitions being hosted or held by the National Cutting Horse Association (NCHA). It is obvious that the occasional hobbyist or professional trainer cannot work his horse often enough using live calves to keep his horse in top condition for shows and competitions.

Numerous attempts have been made to solve the problem of economically training cutting horses such as using mechanical devices. Such past attempts have included using an artificial calf replica or one-dimensional flag mounted to a line to advance or retreat. An operator separate from the horse rider or the horse rider himself could operate the motorized movement of the calf replica or one-dimensional flag in training the horse.

While these attempts have been helpful in being a more economical method of training horses, they still expose an underlying problem of intimidation and high stress to a young learning horse undergoing training. Stress is a known challenge for horses learning how to cut and management of that stress is one of the biggest factors trainers face in successfully training cutting horses to a competitive level. In some instances, horse trainers have found that the use of live cattle or calves has actually been less stressful on the horse than using a simulated calf replica. Here, the calf replica may be appealing to a rider, but it can act as a potential predator to the horse's instincts, thereby creating a highly undesirable learning environment for training the horse. So while the use of moving calf replica's has been helpful in training horses in a horizontal plane or x-axis, it has been more harmful on managing a horse's stress levels, particularly when training the horse in a vertical plane or y-axis with the use of the calf replica.

While these attempts have been helpful in being a more economical method of training horses, they still need an operator to manually move and maneuver the decoy to property train the horse. Hence, what is needed is a device, method, and system that automatically moves and maneuver a decoy for cutting horse training that depends on the horse's location with respect to the decoy.

BRIEF SUMMARY

In particular, in one aspect of the present disclosure described herein, a method, system, and apparatus are provided for a cutting horse trainer that operates to train a cutting horse without additional input from an operator/trainer. More specifically, in one aspect of the disclosure described herein, positioning and tracking systems, such as transmitters, radio frequency, antennas, receivers, camera tracking, accelerometers, and/or GPS tracking allow a cutting horse trainer system to detect the position of the horse with respect to a decoy, or a field of view (azimuth) of the decoy, and automatically adjust the position of the decoy accordingly.

In another aspect of the disclosure described herein, a method of training an animal or cutting horse is disclosed. The method can include positioning a decoy adjacent to the animal, defining a zone for the animal, moving the decoy in one or more directions, automatically tracking one or more movements of the animal in response to the decoy, and detecting if the animal has moved outside of the defined zone, and if the animal has moved outside of the defined zone then moving the decoy in a direction away from the animal. Here, the zone can be defined by an azimuth, angle, perimeter, field of view, one or more imaginary planes, or three-dimensional space. In addition, the decoy can be further coupled to a motorized carrier and the carrier controlled by a remote main control unit. Here, carrier can move along a rail, track, guides, or suspended cable line. Further, the animal can have one or more of a transmitter, beacon, identifiable tag, camera, and RFID attached to it. The decoy can further detect the location or movement of the transmitter or beacon. The decoy can further include one or more of a receiver, transmitter, beacon, identifiable tag, camera, and RFID. Further, the remote control unit can track the movement and direction of both the decoy and the animal with respect to each other. In addition, the animal can be a horse that is controlled, manipulated, stabilized, or ridden by a rider.

In another aspect of the disclosure described herein, a system of training an animal or cutting horse is disclosed. The system can include an object of interest adjacent to the animal, a defined zone for the animal to move within, the object of interest being moved by a carrier in one or more directions, a tracking device configured to track one or more movements of the animal in response to the moved object of interest, and a detection device configured to detect if the animal is within the zone or has moved outside of the defined zone, and if the animal has moved outside of the defined zone then moving the decoy in a direction away from the animal. Here, the zone can be defined by an azimuth or field of view. The object of interest can be coupled to a carriage or the carrier, and the object of interest is spherical in shape. Further, wherein the movement of the object of interest can wirelessly controlled. In addition, the movement of the object of interest can be pre-defined or pre-programmed according to a horse training protocol or horse competition protocol. Further, the timing, distance traveled, and velocity or acceleration of the movement of the object of interest in one or more directions can be pre-defined or automatically controlled.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

Figure 1A:
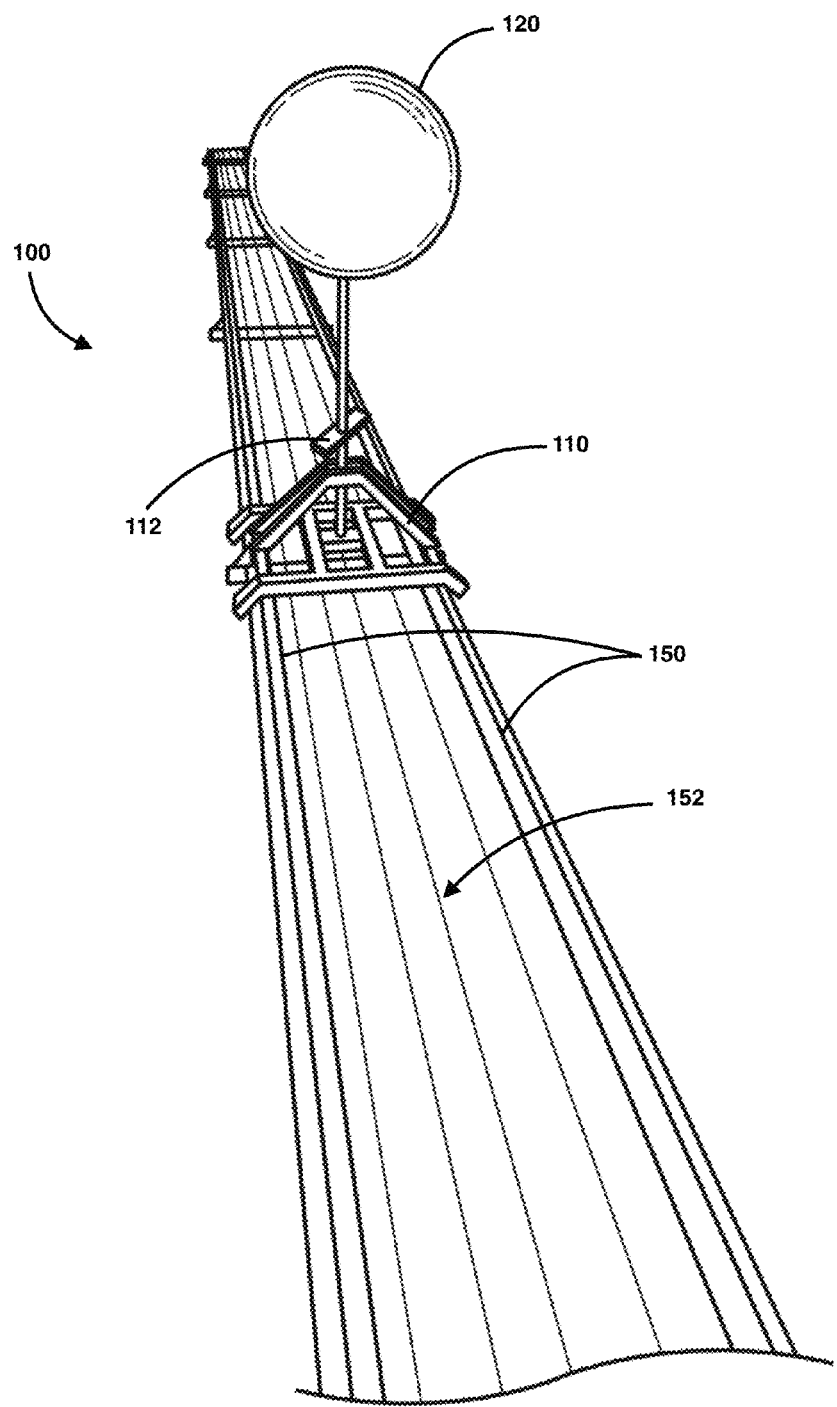
FIG. 1A illustrates a perspective side view of one non-limiting embodiment a position tracking horse trainer apparatus of the present disclosure described herein.
Figure 1B:
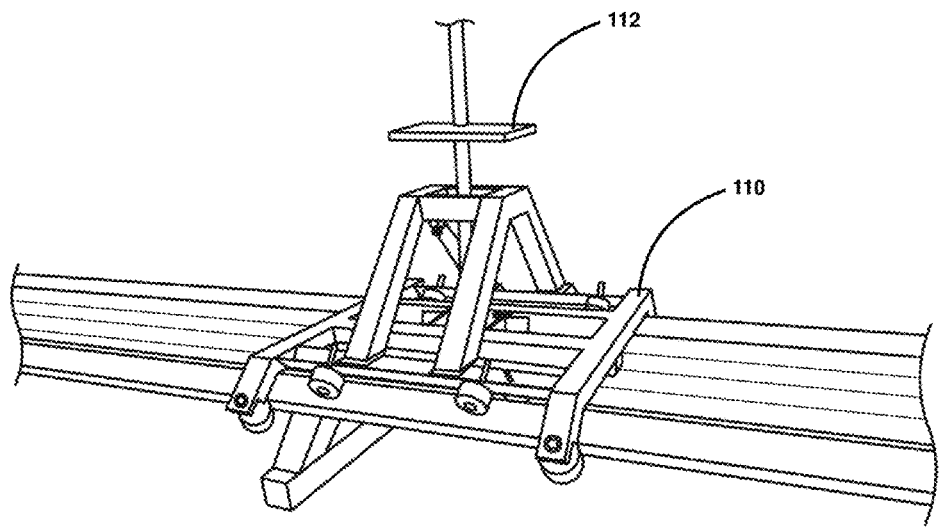
FIG. 1B illustrates a perspective front view of the tracking horse trainer of the present disclosure described herein.
Figure 1C:
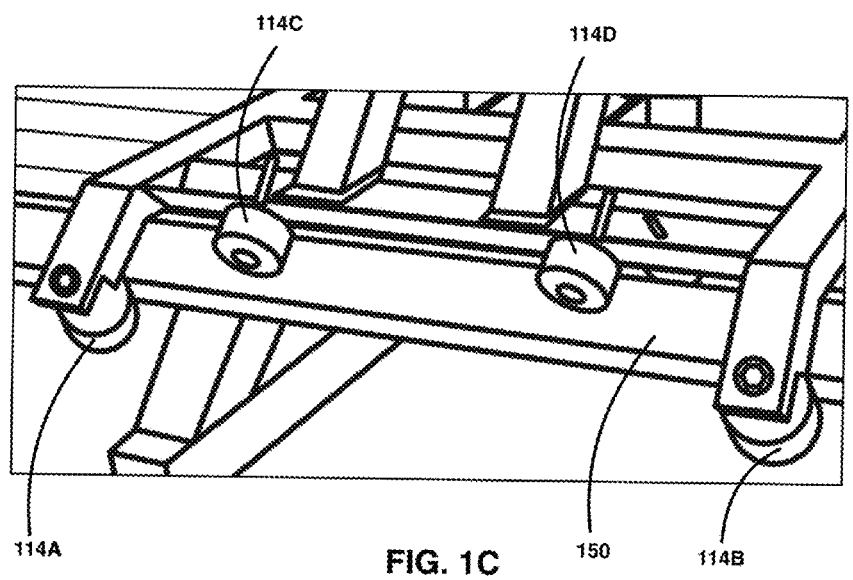
FIG. 1C illustrates a close-up perspective front view of the embodiment of FIG. 1B.
Figure 1D:
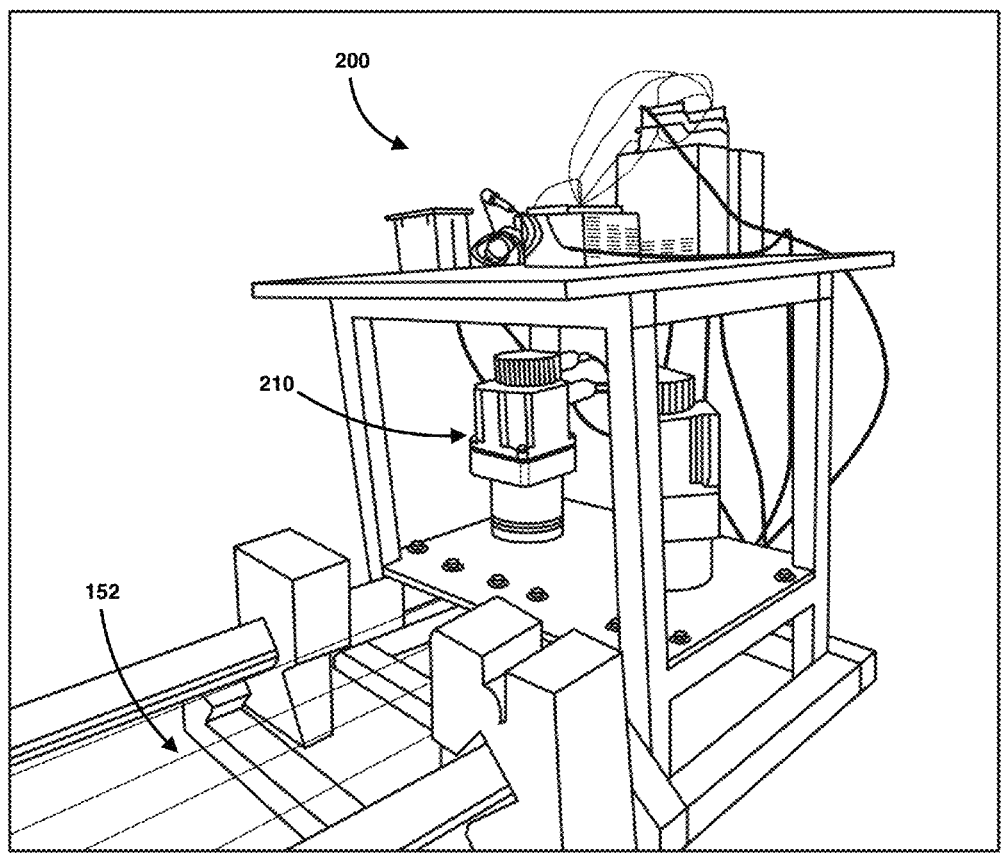
FIG. 1D illustrates a perspective side view of a controller for the horse trainer of the present disclosure described herein.

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Phrases and terms similar to "software", "application", "algorithm", and "firmware" may include any non-transitory computer readable medium storing thereon a program, which when executed by a computer, causes the computer to perform a method or function. Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Any discussion of a server, computing, or mobile device may also apply to any type of networked device, including but not limited to phones such as cellular phones (e.g., an iPhone®, Android®, Blackberry®, or any 'smart phone'), a personal computer, iPad®, server computer, or laptop computer; personal digital assistants (PDAs) such as a Palm-based device or Windows® CE device; a roaming device, such as a network-connected roaming device; a wireless device such as a wireless email device or other device capable of communicating wireless with a computer network; or any other type of network device that may communicate over a network and handle electronic transactions. Any discussion of any mobile or computing device mentioned may also apply to other devices for operating, processing, using, or executing the automated horse tracking and training system and method of the disclosure described herein.

FIGS. 1A-1D illustrate various views for one non-limiting embodiment of a horse trainer position tracking system and apparatus. More specifically, tracking system 100 can include a motorized carriage or carrier 110 having a decoy 120 attached thereto. The carrier 110 can be motorized and move along a pair of tracks or guides 150 in any direction and at any velocity or speed. In addition, the apparatus 100 may also include guide wires or communication wiring 152 that provide bi-directional electrical communication between a central communication controller unit with one or more motors and controllers on-board the carrier 110 for controlling the movement of the carrier. Alternatively, wires 152 can be operated, controlled, driven, and manipulated by a pair of motors 210 at the main control unit, wherein wires 152 are attached to carrier 110 thereby allowing the carrier to be moved and controlled. Here, carrier 110 can have a transmitter and/or receiver 112 that communicates bi-directionally with a central controller unit, such as unit 200 and/or a tracking device attached to a horse. Here, control unit 200 can be any type of wired or wireless controller, central server, mobile device, or computing device. Further, carrier 110 includes a pair of wheels 114A on opposing sides, a pair of wheels 114B on opposing sides, a pair of wheels 114C on opposing sides, and a pair of wheels 114D on opposing sides of the carrier. Here, any one or more of wheels 114A, 114B, 114C, and 114D can be freely rotatable or motorized for driving and moving (or guiding) the carrier along track 150. In addition, wheels 114A-114D can also secure the carrier to the track. Further, it is contemplated within the scope of the disclosure described herein that the decoy 120 can be an artificial calf or cattle, flag, or an object having uniform dimension, sphere, globe ball, cube, or any polygon having three or more sides.

Figure 1E:
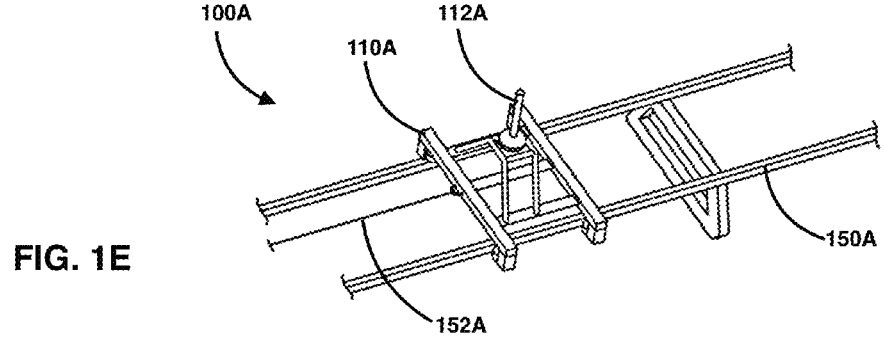
FIG. 1E illustrates a perspective top side view for another non-limiting embodiment of the position tracking horse trainer apparatus of the present disclosure described herein, shown without a decoy.
Figure 1F:
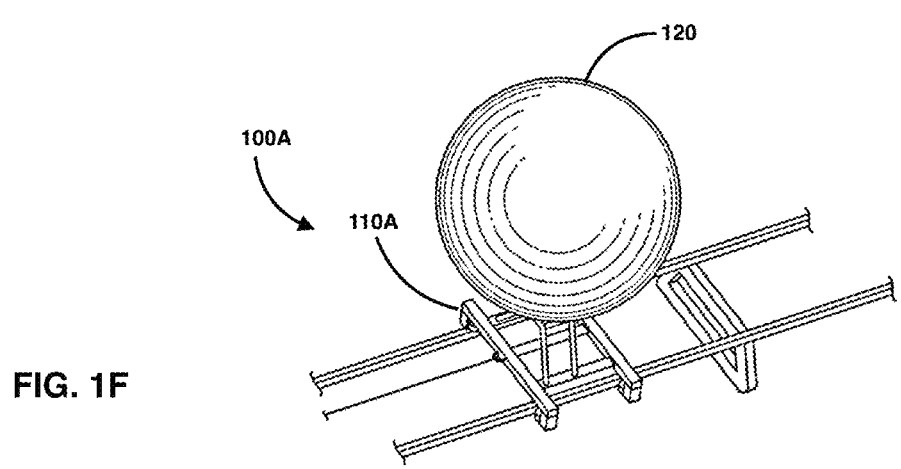
FIG. 1F illustrates a perspective top side view for the position tracking horse trainer apparatus of the present disclosure described herein, shown with a spherical decoy.
Figure 1G:
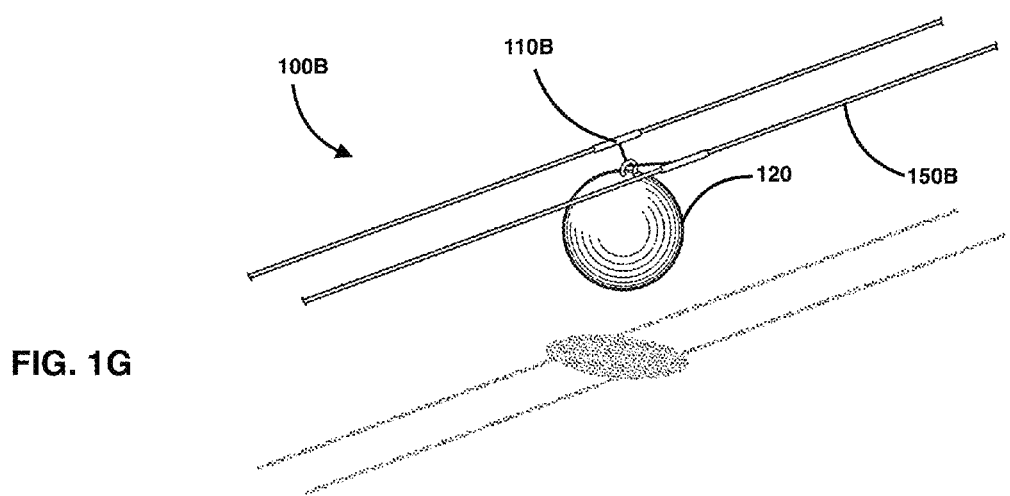
FIG. 1G illustrates a perspective top side view of another non-limiting embodiment for the position tracking horse trainer apparatus of the present disclosure described herein with use on a suspended cable line with a spherical decoy.

FIG. 1E and FIG. 1F illustrate another embodiment for the automated horse trainer, position, and tracking apparatus 100A. More specifically, apparatus 100A is shown having carrier 110A having wheels guided on a raised dual track 150A, wherein FIG. 1E illustrates a carrier without a decoy and an attachment point 112A for decoy 120. In addition, a guiding mechanism, tether coupled to the carrier, or a communication cable may manipulate the movement of carrier 110. FIG. 1G illustrates another embodiment of using the automated horse trainer, position, and tracking apparatus 100B of the disclosure described herein. Specifically, a carrier 110B can be guided along a dual suspended cable line 150B, wherein the carrier 110B and decoy 120 can be automatically controlled by one or more remote controllers according to one or more embodiments of the disclosure described herein.

Figure 1H:
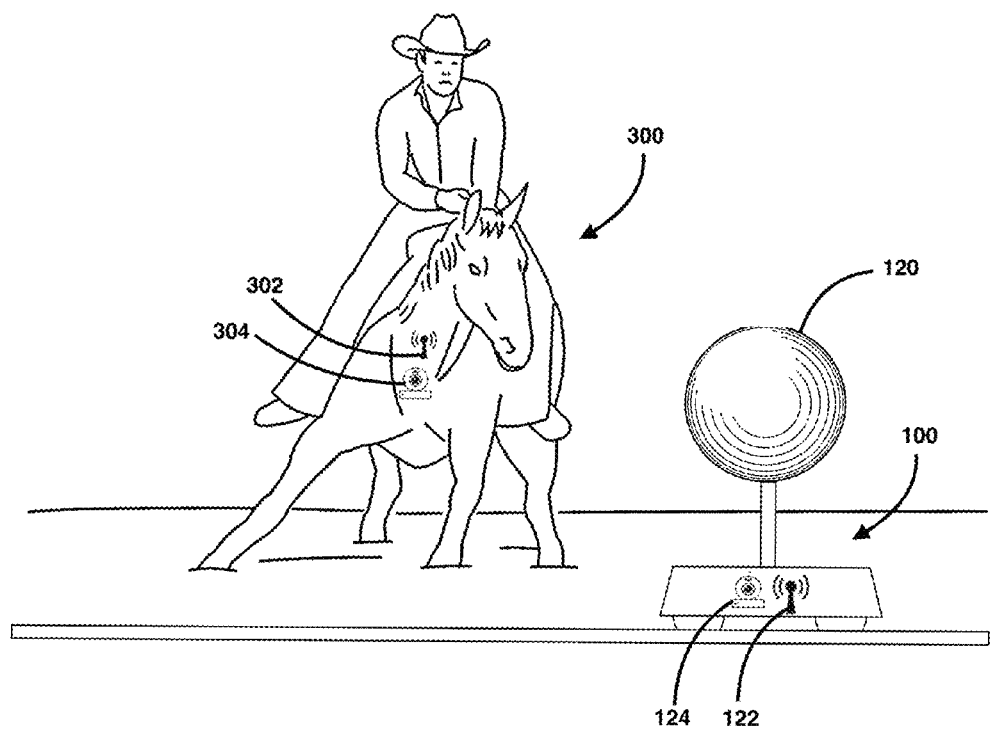
FIG. 1H illustrates a perspective front view of a horse and rider using a spherical object/decoy with the position tracking horse trainer apparatus of the disclosure described herein.
Figure 2A:
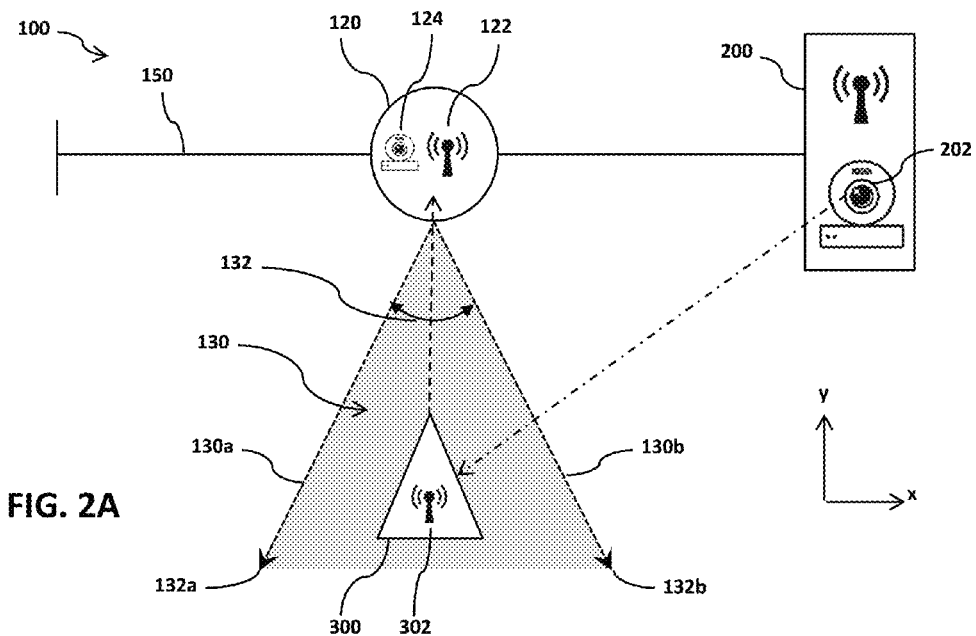
FIGS. 2A-2E illustrates top view schematic diagrams of the position tracking system and method of operation for the present disclosure described herein.
Figure 2B:
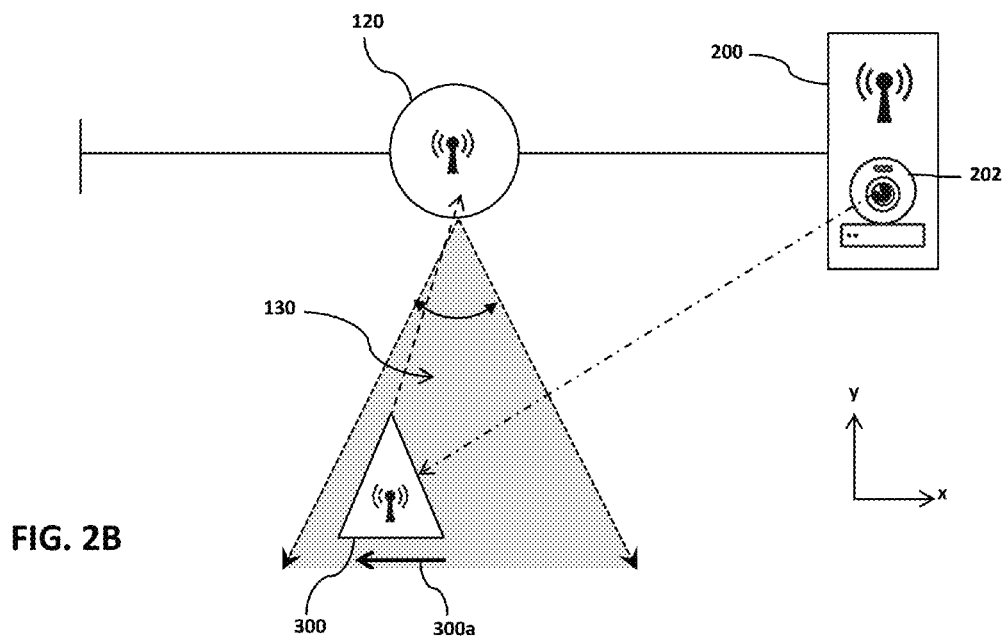

FIG. 1H and FIGS. 2A-2E illustrates one or more systems and methods of operation for the automated horse trainer, position, and tracking apparatus of the present disclosure described herein. Referring now to FIG. 1H and FIG. 2A, the horse trainer system and apparatus 100 can include the decoy 120, which is controlled and/or moved by carrier 110 positioned on track 150. Further, in other embodiments, decoy 120 can be suspended from a line, such as shown in FIG. 1G, whereby the decoy can have one or more rollers that allow the decoy be controlled and moved along the line or move with the line. Further, the trainer system can also include the central control unit 200 having one or more video cameras 202 and wired/wireless transmission devices to communicate bi-directionally with one or more of decoy 120, horse/trainer 300, and/or a Global Positioning System (GPS). More specifically, horse 300 can have one or more wireless transmitter/receivers 302 attached to it or on it that can communicate bi-directionally with the transmitter/receiver 122 of ball decoy 120, the transmitter/receiver of unit 200, or the GPS system. The horse may also include a camera or optical sensor tracking device 304 for communication with other sensors or computing devices. In addition, horse 300 and decoy 120 can further include position tracking devices, such as RFID, radio frequency nodes, antennas, Bluetooth®, wireless devices, gyroscopes, and accelerometers, among others. In addition, decoy 120 can also have a camera 124 attached or integrated thereto for tracking, recording, and/or streaming video. For example, in one embodiment, the azimuth 132 and zone 130 can be defined and set by camera 124. Further, the tracking system of the disclosure described herein can also be an asset or inventory control system.

Still referring to FIG. 2A, the decoy has an azimuth/angle 132 that is in a field of view 130, wherein the field of view, area, or zone 130 is illustratively bounded by imaginary lines 130a and 130b. More specifically, it is the object of the disclosure described herein to keep the horse within the field of view or zone 130 with respect to the decoy 120. In addition, there may be one or more references points or points of interest in a distance, such as points 132a and 132b. Furthermore, in one embodiment, the transmitter/receivers of decoy 120 and horse 300 can operate in the same radio frequency. Further, the angle or azimuth 132, which controls the zone area 120, can be adjusted to be made smaller or larger, depending on the horse, rider, training regimen, and the horse's level of skill. It is contemplated within the scope of the disclosure described herein that the system can use predominantly radio frequency (RF) technology for tracking the horse and thereby manipulating the decoy.

Figure 2C:
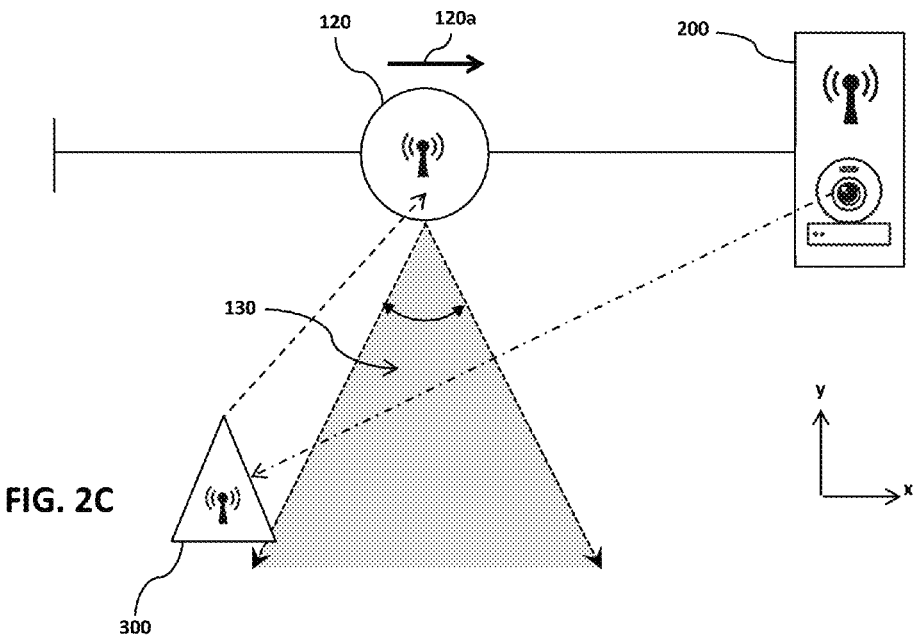
Figure 2D:
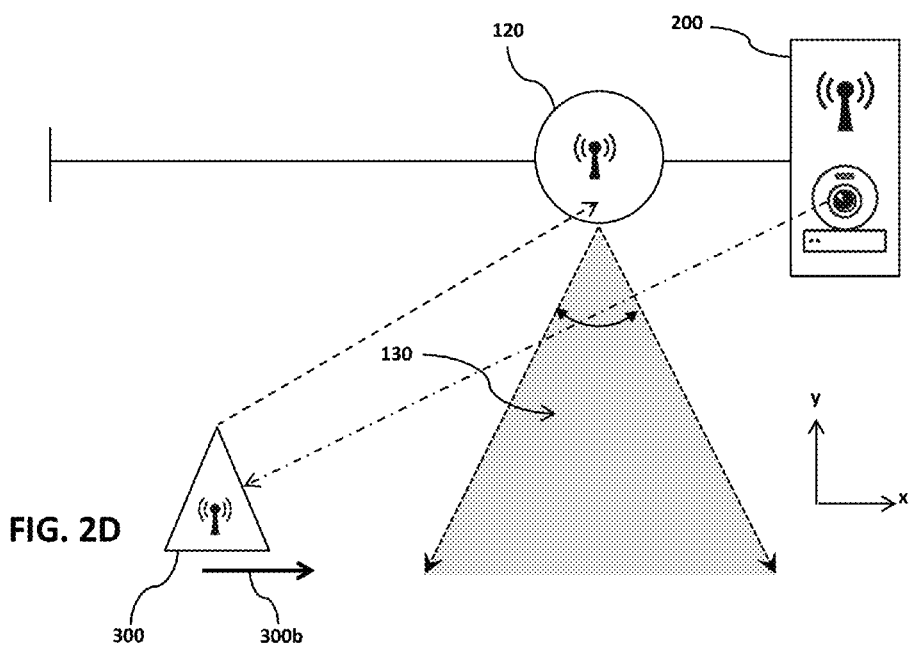
Figure 2E:
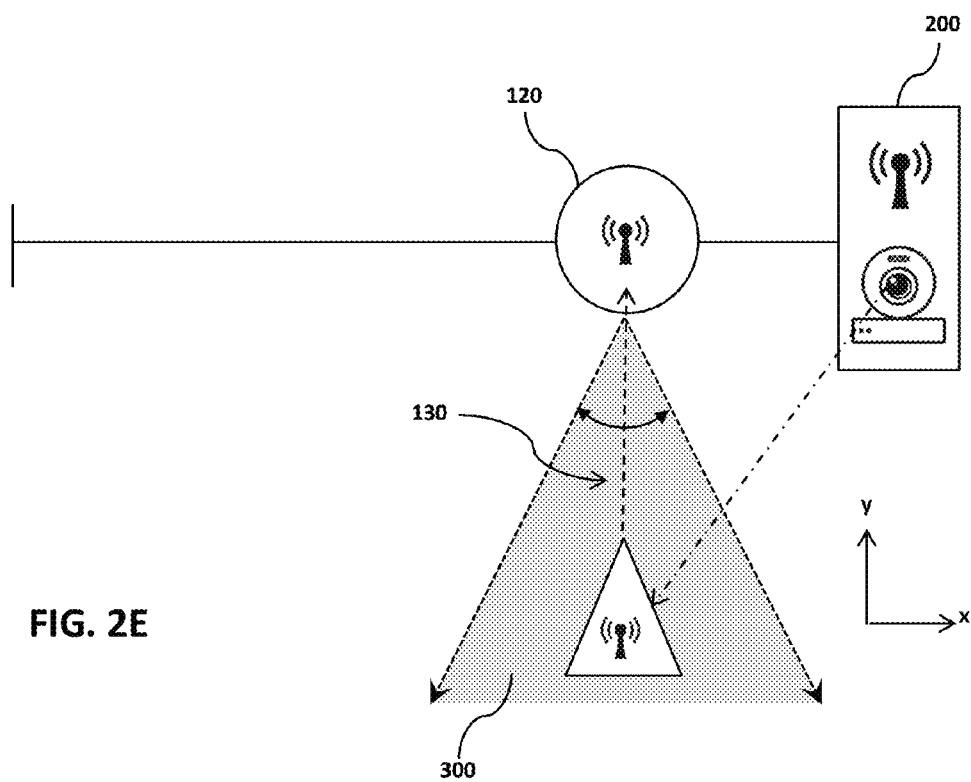

Referring now to FIGS. 2B-2E, in one system or method of operation, when the horse 300 moves in a horizontal x-axis direction 300a, camera 202 or camera 204 can track, record, stream and display its movements. Further, the camera on the decoy 120 may also track, record, and stream the horse's movements. Here, if horse 300 moves outside the zone 130, as shown in FIG. 2C, the system will detect this and initiate automatic movement of the decoy in the opposite direction 120a of the horse's movement. As a result, as shown in FIG. 2D, the horse will run back in direction 300b towards the decoy thereby placing it within zone 130 once again, as shown in FIG. 2E. Here, the object is to keep the horse within zone 130 as the decoy 120 moves back and forth along the x-axis, and more preferably keeping the horse in the middle of zone 130, where the horse is directly aligned with, facing, or perpendicular to decoy 120. Further, the trainer system of the disclosure described herein can also be configured to detect movement of the horse in the y-axis or vertical direction. For example, a separate zone can be set up within zone 130 that can detect if the horse is getting too close or too far from decoy 120, thereby initiating automatic movement of the decoy in the left or right direction.

Figure 3:
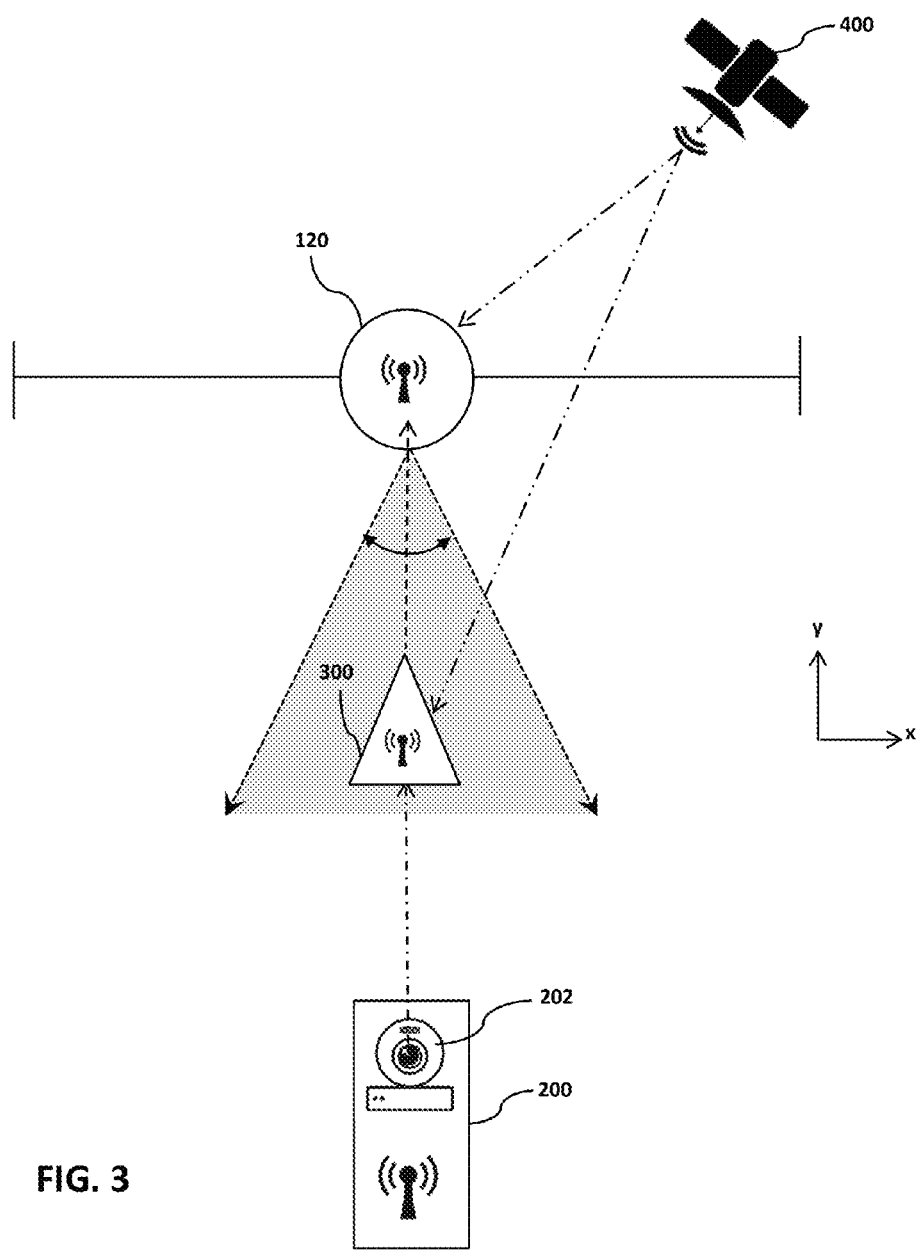
FIG. 3 illustrates a top view schematic diagram of another embodiment of the position tracking system.

FIG. 3 illustrates another embodiment of the horse trainer system. Here, unit 200 is illustrated as being remote and at a distance with respect to track 150 and decoy 120, wherein unit 200 can wirelessly control decoy 120. Further, camera 202 or 124 (not shown here) can also track, record, stream, and display the movement of horse 300 and decoy 120. In addition, a GPS satellite system 400 or a remote tracking system may further track the movement of horse 200 with respect to decoy 120, wherein the GPS system can further send commands to unit 200 to control the movement of decoy.

It is contemplated within the scope of the disclosure described herein that any of the decoy, horse, or control unit can communicate with each other via a network, Bluetooth®, radio, or NFC communication. In addition, a central system or remote user can further wirelessly control the decoy from a remote location from an independent controller, mobile device, or computing device, among others.

In addition, the horse trainer system of the present disclosure described herein may use other tracking systems, such as a communication system that can include an antenna module, a base, one or more motors, and processing circuitry, wherein the antenna module comprises a receive antenna and a plurality of tracking antennas, the motors are configured to rotate the antenna module and/or tilt the receive antenna relative to the base, and the processing circuitry is configured to receive inputs from the tracking antennas and to control the motors based, at least in part, on these inputs. In addition, a radio frequency (RF) motion capture system can be used that includes stationary sensor receivers, one or more transmitter marker tags on one or more objects to be tracked within a capture zone, at least one stationary reference tag transmitter, and a processing system for processing the received signals. The individual tags transmit burst of spread-spectrum RF signals. The transmitted signals include a common sync code, and a tag identification code that is unique to each tag. By computing double differences of pseudoranges, clock terms are cancelled out allowing the processing system to precisely determine the location of each tag as it moves through the capture zone without the need to synchronize clocks between sensors and tags. The system can be used for RF match moving. Other systems that can be used with the disclosure described herein can include a Real Time Locating System (RTLS) to automatically identify and track the location of the horse or animal in real time, such as within a zone or contained area. Other systems that can be used with the disclosure described herein can include a radio direction finder or Automatic Directional Finder (ADF) or non-directional beacon (NDB) tracking the horse or animal.

It is contemplated within the scope of the disclosure described herein that the tracking system may be pre-programmed to move the decoy in one or more patterns, instances, iterations, speeds, accelerations, velocities, and for one or more certain time periods. In addition, the training system of the present disclosure described herein is not limited to cutting horse training, and can further include training horses for other sports. Further, the trainer system of the present disclosure described herein is not limited to horses, and can be used to train any other type of animal for any sport, competition, show, recreational, or education/obedience. In addition, it can be used for hunting sports, such as training/competition for handgun, rifle, bow and arrow target users.

It is contemplated within the scope of the disclosure described herein that the decoy 120 can be an artificial calf or cattle, flag, an object having uniform dimension, sphere, globe ball, cube, or any polygon having three or more sides. Further it is contemplated within the scope of the disclosure described herein that the track/rail/guides can be a single track, double track, plurality of tracks, or the carrier can be mounted on or from track cables, such as overhead cables, or on a side/vertical track/post.

It is contemplated within the scope of the disclosure described herein that tracking/positioning system may also include a remote header board displaying one or more horse's number and having a resettable time clock and score, or other display features. For example, the tracking positioning system of the present disclosure described herein can be used in competition or at a show, capable of creating a competitive and intelligent (artificial intelligence/automated) competition. The contest horse can be assigned an entry number to be displayed on a reader board. The reader board can also display count down time for which the entry will preform, before an alarm or other method announces end of time. An electronic system or device, such as a broken laser beam, will start the count down timer. The reader board also provides a score for that completed performance. The score can be measured by the difficulty created from the tracking system of the present disclosure described herein. For example, in one embodiment, scoring factors may include speed of the target/decoy/object, performing within a predetermined aperture or time period, and complexity of the computer/software-generated moves of the decoy can be used to compile and determine the reader board score. In addition, for competitive competition purpose, in one embodiment, the sequence for each competitor will include a first work with a posted score, a second work with a posted score and total of the first and second works. Further, third work can be known as semi finals which may or may not use the device, system, o method of the present disclosure described herein. A fourth work can be known as the finals, which may use the tracking device, system, and method of the present disclosure described herein, or alternatively using live cattle.

From the foregoing it will be seen that the disclosure described herein is one well adapted to attain all ends and objectives herein-above set forth, together with the other advantages which are obvious and which are inherent to the disclosure described herein.

Since many possible embodiments may be made of the disclosure described herein without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the disclosure described herein is not limited to the specific forms or arrangement of parts described herein, except insofar as such limitations are included in the following claims. Further, it will be understood that certain features and sub-combinations are of utility and may be employed without reference to other features and sub-combinations.

What is claimed is:

1. A method of training an animal, the method comprised of:
    positioning an object adjacent to an animal;
    defining a zone for the animal;
    moving the object in one or more directions via a motorized apparatus along a track, wherein the motorized apparatus comprises a plurality of wheels engaging the track at an angle relative to the track;
    tracking one or more movements of the animal, wherein the tracking is comprised of a first tracking device for tracking the one or more movements of a second tracking device on or around the animal and moving with the animal; and
    detecting when the second tracking device has moved outside of the defined zone based on the tracking of the second tracking device on or around the animal and moving with the animal, and when the second tracking device and animal have moved outside of the defined zone then moving the object in a direction away from the animal.

2. The method of claim 1, wherein the zone is defined by an azimuth.

3. The method of claim 1, wherein the motorized apparatus is further comprised of a motorized carrier and wherein the object is coupled to the motorized carrier.

4. The method of claim 3, wherein the carrier is controlled by a remote control unit.

5. The method of claim 3, wherein the track is further comprised of a rail, guide, or trackway.

6. The method of claim 1, wherein the second tracking device comprises one or more of: a transmitter, beacon, identifiable tag, camera, RFID, and Real Time Location System (RTLS).

7. The method of claim 1, wherein the first tracking device is on or around the object.

8. The method of claim 1, wherein the first tracking device comprises one or more of: a receiver, transmitter, beacon, identifiable tag, camera, RFID, and Real Time Location System (RTLS).

9. The method of claim 4, wherein the remote control unit tracks the movement and direction of both the object and the animal with respect to each other.

10. The method of claim 1, wherein the object is spherical.

11. The method of claim 10, wherein the tracking and detecting is further used to evaluate or score the horse for a given time period in a show, competition, or event.

12. A system for training an animal, the system comprised of:
- an object of interest positioned adjacent to the animal and secured to a motorized carrier;
- a defined zone for the animal to move within, wherein the zone is further defined by a field of view of a camera unit on or around the carrier, and wherein the defined zone moves with the carrier;
- the object of interest being moved by the carrier in one or more directions along a track, wherein the carrier comprises a plurality of wheels engaging the track at an angle relative to the track;
- a tracking unit configured to track one or more movements of the animal, wherein the tracking unit is comprised of a first tracking device for tracking the one or more movements of a second tracking device moving with the animal; and
- a detection unit configured to detect when the animal is within the defined zone or has moved outside of the defined zone based on the second tracking device on or around the animal and moving with the animal, and when the animal has moved outside of the defined zone then moving the object in a direction away from the animal.

13. The system of claim 12, wherein the zone is defined by an azimuth or field of view.

14. The system of claim 12, wherein the object is coupled to a carriage or the carrier, and the object of interest is spherical in shape.

15. The system of claim 12, wherein the carrier or the object is wirelessly controlled.

16. The system of claim 12, wherein the movement of the carrier or object is pre-defined or pre-programmed according to a horse training protocol or horse competition protocol.

17. The system of claim 12, wherein the timing, distance traveled, and velocity or acceleration of the movement of the carrier or object in one or more directions is pre-defined or automatically controlled.

18. A method of training an animal, the method comprised of:
- positioning an object adjacent to an animal, wherein the object is further secured to a motorized carrier;
- defining a zone for the animal, wherein the zone is defined by a field of view angle of a camera, and wherein the camera is further coupled to the object or to the carrier;
- moving the object, carrier, and camera in one or more directions along a track, wherein the motorized carrier comprises a plurality of wheels engaging the track at an angle relative to the track, thereby further moving the zone; and
- tracking one or more movements of the animal within or outside of the zone, wherein the tracking is comprised of a first tracking device for tracking the one or more movements of a second tracking device on or around the animal and moving with the animal.

* * * * *